June 5, 1923.

Re. 15,622

F. E. MARCY

ROLLER MILL

Original Filed Jan. 25, 1919

Inventor
F. E. Marcy
By Rogers, Kennedy, Campbell & Hays

Reissued June 5, 1923. Re. 15,622

UNITED STATES PATENT OFFICE.

FRANK E. MARCY, OF LOS ANGELES, CALIFORNIA.

ROLLER MILL.

Original No. 1,361,601, dated December 7, 1920, Serial No. 273,097, filed January 25, 1919. Renewed October 13, 1920, Serial No. 416,773. Application for reissue filed November 29, 1922. Serial No. 604,094.

DIVISION B.

*To all whom it may concern:*

Be it known that I, FRANK E. MARCY, a citizen of the United States, residing at Los Angeles, in the county of Los Angeles and State of California, have invented certain new and useful Improvements in Roller Mills, of which the following is a specification, reference being had to the accompanying drawings, forming a part thereof, the same being a division of an application filed on the 16th day of November, 1922, Serial No. 601,240, for reissue of my Patent No. 1,361,601, dated December 7, 1920.

The present invention is directed to improvements in roller (or rod) mills which, as well understood in the art, belong to that class of reducing or disintegrating apparatus wherein the material is reduced by means of freely moving reducing bodies in the form of rods or rollers extended longitudinally substantially the length of the reducing compartment of the mill, the latter being in the form of a suitable tumbling barrel, drum, or equivalent tubular container or treatment vessel rotated about a fixed axis, the opposite ends of the barrel being provided respectively with intake or feed, and discharge openings for the material. The present improvement is concerned with that type of mill in which the discharge end is left open and unobstructed (in contradistinction to the trunnion overflow type of mill) for the passage of the reduced material therethrough and for the purpose of affording access to the interior of the mill at all times, and permitting inspection of its contents at any stage of the reducing operation. A mill of the open end type here referred to is preferably, though not necessarily, provided with a flange or diaphragm at the point of discharge, and it is desirable in a mill of the character referred to, to provide means for preventing the reducing bodies from being projected out of the mill through the open discharge end, or through the available opening defined by the inner edge of the flange aforesaid; and in the present embodiment of my invention I resort to a suitable rod-intercepting door or guard mounted in relation to the barrel in such a way that while it permits of the free and uninterrupted discharge of the material from the mill, it yet serves as an effective barrier against the accidental escape, projection or precipitation of the reducing bodies from the mill. As intimated above, the guard partakes of the nature of a door which is movable relatively to the barrel, that is it may be opened for purposes of inspection of the mill contents or for the purpose of gaining access to the reducing compartment of the mill at any stage of the reducing operation.

The present improvement is characterized mainly by simplicity of construction and effectiveness in operation, and advantages of the improvement will be clearly apparent from the following detailed description in connection with the accompanying drawings in which—

Figure 1:
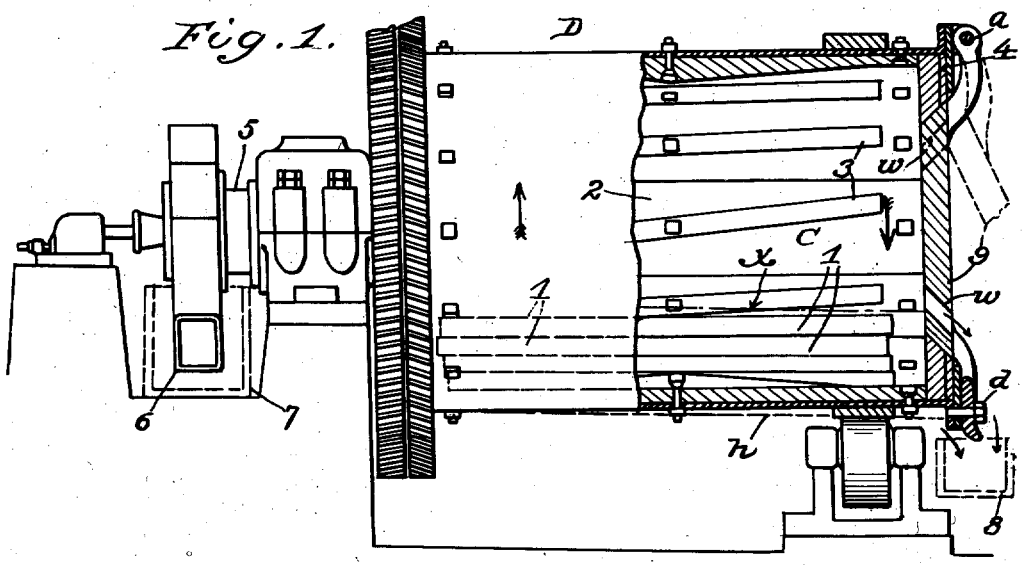
Fig. 1 represents a side elevation of a mill with parts broken away, showing my invention embodied therein.

Referring to the drawings:

D represents a (preferably) cylindrical container, drum, tumbling barrel or equivalent tubular member slightly pitched to the horizontal *h*, the reducing compartment C of the barrel containing the usual complement of reducing bodies which in the present example are in the form of longitudinally extended, loose, elongated reducing rods or rollers 1 free to tumble in the barrel as the latter rotates in the operation of the mill, only a portion of the entire complement of rods being herein illustrated. The wall liner 2 is provided with inclined lifters 3 which operate to first lift the rods and then release them in such a way as to cause the rods to tumble or precipitate away from the discharge opening of the mill, the rods being maintained permanently in the reducing compartment C through the combined action of the pitch of the mill, the lifters 3, the flange 4 on the open discharge end of the mill which likewise serves to raise or build up the pulp line, and the guard or rod-intercepting plate or door to which the present improvement is in the main directed. In the present example, the mill is provided with a hollow feed or intake trunnion 5 equipped with a conventional scoop feeder 6, which scoops up the pulp from a suitable launder 7, the material discharged from the mill being caught in a launder 8 as well understood in the art.

Figure 2:
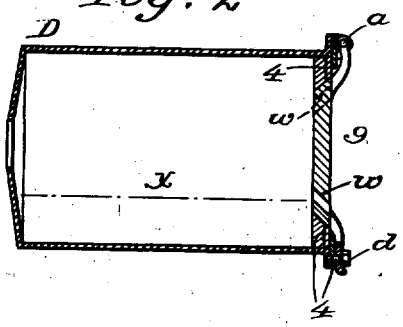
Fig. 2 is a vertical middle longitudinal section of the barrel of the mill.
Figure 3:
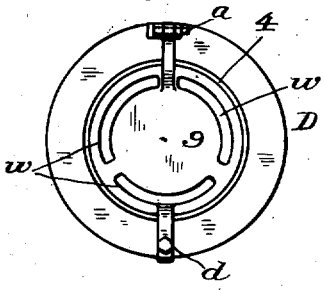
Fig. 3 is an end view of Fig. 2.

In the present improvement the guard or rod-intercepting member is carried by the barrel D and assumes the form of a door 9 in front of the flange 4 and preferably hinged to the barrel, the diameter of the door being such that it will fit in the opening defined by the inner edge of the flange and thus close said opening. The door is hinged to the barrel in the present instance by means of a pivot pin *a*, and is locked normally closed by means of a cap-screw *d* as clearly shown in Figs. 1 and 2. The door is formed with a circular, substantially continuous discharge slot or passage-way *w* at such a point as to raise the pulp line *x* the desired degree. The passage-way or slot through the door extends circumferentially, and at the outer face of the door it is interrupted at intervals by intact portions of the door or its equivalent; but this interruption in no wise interferes with the free discharge of the pulp from the mill which takes place wholly within the limits of the wall of the barrel. As shown, the slot or passage-way in the door has its outer wall inclined outwardly away from the axis of the barrel. Preferably the periphery of the door 9 is made beveled or conical and the inner edge of the flange is correspondingly formed to receive the door; and the pulp which builds up to the line *x* flows out through the passage-way in the door and into the launder 8 as indicated by the arrows.

As stated above the function of the door or guard 9 is to intercept any rod tending to precipitate out of the mill during the reducing operation; but the door may be swung open at any stage of the reducing operation to allow for the inspection of the mill contents, to make necessary repairs, and the like.

The diameter of the door will necessarily depend on the width of the flange 4; and where such a flange is dwarfed or entirely absent, the door is correspondingly enlarged so as to entirely close the end of the barrel, and the discharge slot may be formed in the door at any fixed radial distance from the center of the door, depending upon the desired pulp line.

The operation is the same as in all mills of the general type or class to which the present mill belongs. The mill or barrel is given a rotation in the direction indicated by the arrows in Fig. 1, the wall nearest the reader sweeping upward while the wall farthest away is descending. The reducing rods 1 tumble freely across the compartment C, but since in their tumbling movements they are constantly being directed away from the discharge opening by the combined action of the pitch of the mill, and the inclined lifters, it follows that the rods will remain normally out of contact with the door or guard 9, but any rod which happens to strike the door 9 will of course necessarily be intercepted and prevented from falling out of the mill. The impact of the rods against the door is not however frequent as the rods are in the main kept in the mill by the pitch of the mill, by the deflecting action of the lifters 3, and by the flange 4. The pulp enters the reducing compartment C through the hollow feed trunnion 5 and the finished product discharges directly as previously indicated through the passage-way in the door.

The door or rod-intercepting member or plate 9 is, it will be observed, disposed across the rotation axis of the mill or barrel, said axis passing preferably through the center of the door, and as the flange 4 extends inwardly from the wall of the barrel towards the rotation axis, the door closes across the plane of disposition of the flange.

In the construction described, the discharge slot for the material conforms to the position desired for the pulp line, which, of course may be raised or lowered according to circumstances, and according to conditions to be met in practice. The present invention of course is not to be restricted in its application to mills with a pulp line of a definite height, but is to be understood as applicable to mills having any range of pulp line positions from the lowest to the highest which may be tolerated in practice.

Having described my invention, what I claim is:

1. In a mill of the character described, a rotatable barrel having a feed end and a discharge end and provided with a reducing compartment adapted to contain longitudinally extending, loose, freely movable, reducing rods, and a rod-intercepting guard closing across the discharge end and adapted to be moved at will to a position to permit access to the reducing compartment, said guard having its inner surface substantially free of obstructions to free movement of the rods having a discharge opening extending through it from one side to the other for the discharge of the material from the reducing compartment directly through the guard, and the said guard serving when in closed position to intercept the reducing rods to prevent their accidental escape.

2. In a mill of the character described, a rotatable barrel having a feed end and a discharge end and provided with a reducing compartment adapted to contain longitudinally extending, loose, freely movable, reducing rods, and a rod-intercepting guard attached to the barrel and disposed across the discharge end and adapted to be moved at will to a position to permit access to the reducing compartment, said guard having its inner surface substantially free of obstructions to free movement of the rods and being provided with a suitable discharge slot at a fixed radial distance from the center of the guard for the discharge of the material from the reducing compartment directly through the guard, and said guard serving when disposed across the discharge end of the barrel to intercept the reducing rods to prevent their accidental escape.

3. In a mill of the character described, a rotatable barrel having a feed end and a discharge end and provided with a reducing compartment adapted to contain longitudinally extending, loose, freely movable, reducing rods, and a rod-intercepting guard disposed across the discharge end and adapted to be moved at will to a position to permit access to the reducing compartment, said guard being provided with a circular substantially continuous discharge slot extending through it from one side to the other for the discharge of the material from the reducing compartment directly through the guard, and the said guard serving when disposed across the discharge end of the barrel to intercept the reducing rods to prevent their accidental escape.

4. In a mill of the character described, a rotatable barrel having a feed end and a discharge end and provided with a reducing compartment adapted to contain longitudinally extending, loose, freely movable, reducing rods, and a rod-intercepting guard disposed across the discharge end and adapted to be moved at will to a position to permit access to the reducing compartment, said guard being provided with a circular substantially continuous discharge slot interrupted at the outer side of the guard, and extending through it from one side to the other for the discharge of the material from the reducing compartment directly through the guard, and the said guard serving when disposed across the discharge end of the barrel to intercept the reducing rods to prevent their accidental escape.

5. In a mill of the character described, a rotatable barrel having a feed end and a discharge end and provided with a reducing compartment adapted to contain longitudinally extending, loose, freely movable, reducing rods, and a rod-intercepting guard fitting within the discharge end and adapted to be moved at will to a position to permit access to the reducing compartment, said guard having its inner surface substantially free of obstructions to free movement of the rods and having a discharge opening extending through it from one side to the other for the discharge of the material from the reducing compartment directly through the guard, and the said guard serving when in closed position to intercept the reducing rods to prevent their accidental escape.

6. In a mill of the character described, a rotatable barrel having a feed end and a discharge end and provided with a reducing compartment adapted to contain longitudinally extending, loose, freely movable, reducing rods, and a rod-intercepting guard attached to the barrel and disposed across the discharge end and adapted to be moved at will to a position to permit access to the reducing compartment, said guard having its inner surface substantially free of obstructions to free movement of the rods and being provided with a suitable discharge slot for the discharge of the material from the reducing compartment directly through the guard, the said slot being spaced a substantial distance from the wall of the barrel to build up or raise the pulp line in the mill, and said guard serving when disposed across the discharge end of the barrel, to intercept the reducing rods to prevent their accidental escape.

7. In a mill of the character described, a tumbling barrel having a feed end and a discharge end to provide a reducing compartment adapted to contain elongated, loose, freely movable, reducing bodies, and a hinged door closing across the discharge end and adapted to prevent the accidental escape of the reducing bodies from the end of the reducing compartment, a suitable passage-way being formed through the door and so disposed as to effect the direct discharge of material from the barrel wholly within the limits of the wall of the barrel.

8. In a mill of the character described, a rotatable barrel adapted to contain reducing bodies and having a feed end and a discharge end, and a guard disposed across the discharge end of the barrel to prevent discharge of said bodies, a suitable circumferential slot being formed through the guard for the direct discharge of the material, the outer wall of said slot being inclined outwardly away from the axis of the barrel.

9. In a mill of the character described, a tumbling barrel having a feed end and a discharge end, an inwardly projecting flange at the discharge end of the barrel, and a door fitting within the flange and movable relatively thereto, and provided with a passage-way through it for effecting the direct discharge of material from the barrel.

In testimony whereof, I have affixed my signature hereto.

FRANK E. MARCY.